United States Patent
Katayama et al.

(10) Patent No.: US 8,560,000 B2
(45) Date of Patent: Oct. 15, 2013

(54) TRANSMIT POWER CONTROL METHOD FOR REDUCING CELLULAR INTERFERENCE IN CELLULAR RADIO COMMUNICATION SYSTEM AND RADIO BASE STATION DEVICE FOR IMPLEMENTING THE SAME

(75) Inventors: Rintaro Katayama, Fujisawa (JP); Satoshi Tamaki, Yokohama (JP); Tomonori Yamamoto, Fujisawa (JP); Hirotake Ishii, Yokohama (JP); Shigenori Hayase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 12/986,377

(22) Filed: Jan. 7, 2011

(65) Prior Publication Data
US 2011/0212744 A1    Sep. 1, 2011

(30) Foreign Application Priority Data

Feb. 26, 2010 (JP) ................. 2010-041280
Jul. 28, 2010 (JP) ................. 2010-168808

(51) Int. Cl.
*H04W 52/24* (2009.01)

(52) U.S. Cl.
USPC .......................... 455/522; 455/561

(58) Field of Classification Search
None
See application file for complete search history.

(56) References Cited

U.S. PATENT DOCUMENTS 6,385,184 B2 *    5/2002   Kitade et al. ................. 370/337

| | | |
|---|---|---|
| 2009/0253461 A1 | 10/2009 | Kuwahara |
| 2010/0248735 A1 | 9/2010 | Hamabe et al. |
| 2011/0003557 A1 | 1/2011 | Morita et al. |

FOREIGN PATENT DOCUMENTS

| | | |
|---|---|---|
| EP | 0 955 735 A2 | 11/1999 |
| JP | 2007-243505 | 9/2007 |
| JP | 2009-231912 | 10/2009 |
| JP | 2009-253569 | 10/2009 |
| WO | WO 2009/047972 | 4/2009 |
| WO | WO 2009/072355 | 6/2009 |
| WO | WO 2009/119212 | 10/2009 |
| WO | WO 2011/103515 | 8/2011 |

OTHER PUBLICATIONS

European Search Report for Application No. 11150985.7-1246 / 2362698, issued on Jun. 13, 2012.
JP Office Action for Japanese Application No. 2010-168808, issued on Jun. 18, 2013.

* cited by examiner

*Primary Examiner* — Philip Sobutka
(74) *Attorney, Agent, or Firm* — Antonelli, Terry, Stout & Kraus, LLP.

(57) ABSTRACT

A communication device includes pilot signal sending part and transmit power control part and holds a criterion value indicating target channel quality for mobile stations within the area covered by the base station. It creates quality data from reports from one or plural mobile stations, stores the quality data, creates a first representative value indicating average channel quality for the mobile station(s) from the stored quality data, and changes the transmit power depending on the result of comparison between the first representative value and the criterion value. It creates a second representative value indicating distribution of low channel quality from the stored quality data and updates the criterion value depending on the result of comparison between the second representative value and the criterion value.

13 Claims, 12 Drawing Sheets

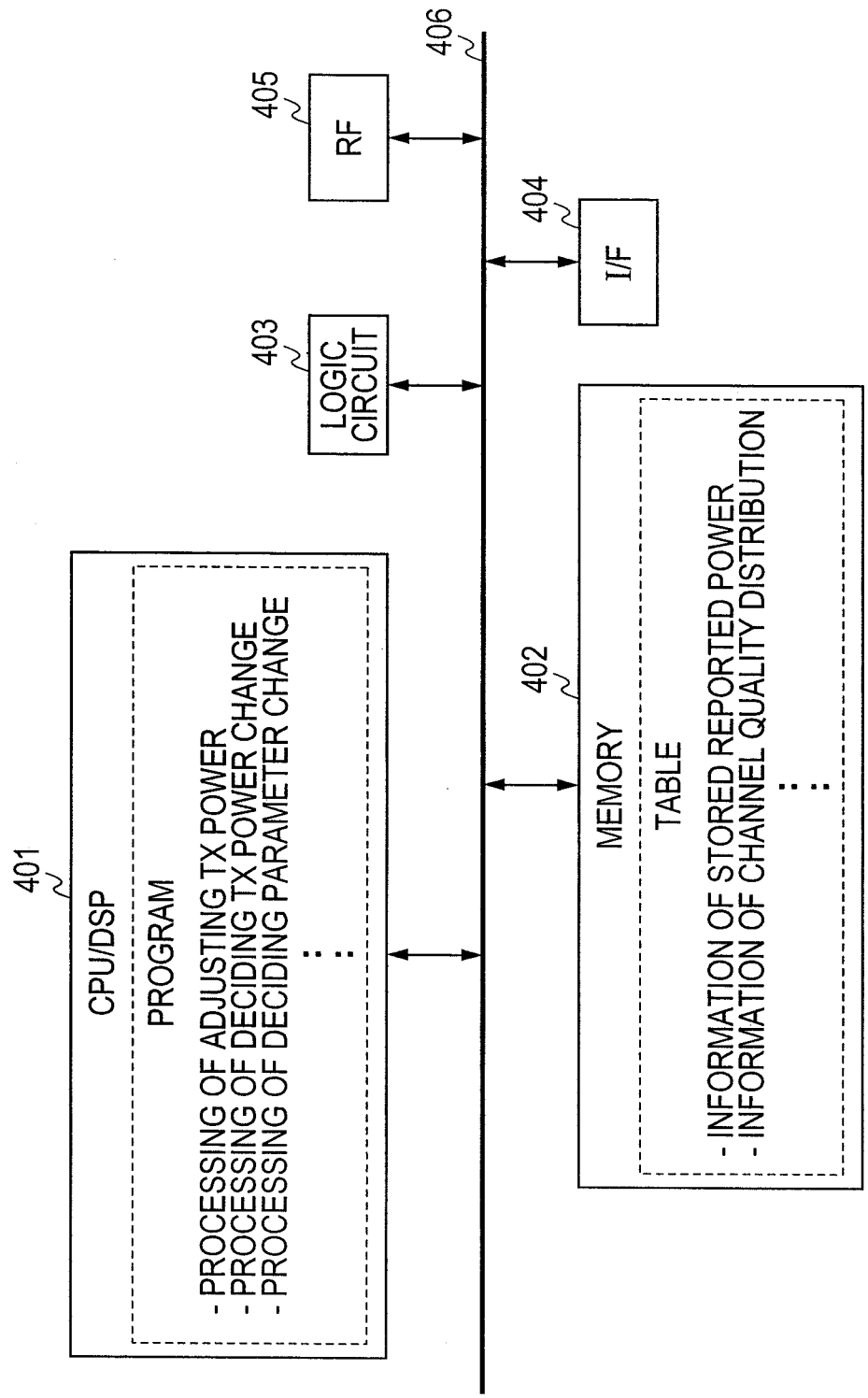

FIG. 5

| 1010 | 1020 | 1030 | 1040 |
|---|---|---|---|
| MOBILE STATION ID | TIME STAMP | BASE STATION ID | REPORTED RECEIVED POWER VALUE |
| | TIME STAMP | BASE STATION ID | REPORTED RECEIVED POWER VALUE |
| | TIME STAMP | BASE STATION ID | REPORTED RECEIVED POWER VALUE |
| | TIME STAMP | BASE STATION ID | REPORTED RECEIVED POWER VALUE |

FIG. 6

| 1110 | 1120 | 1130 | |
|---|---|---|---|
| MOBILE STATION ID | TIME STAMP | SIR (SIGNAL-TO-INTERFERENCE POWER RATIO) | |
| MOBILE STATION ID | TIME STAMP | SIR (SIGNAL-TO-INTERFERENCE POWER RATIO) | |
| MOBILE STATION ID | TIME STAMP | SIR (SIGNAL-TO-INTERFERENCE POWER RATIO) | ............ |
| MOBILE STATION ID | TIME STAMP | SIR (SIGNAL-TO-INTERFERENCE POWER RATIO) | |

FIG. 14

| RANK ORDER | MS ID | REPORTED CHANNEL QUALITY [dB] | CHANNEL QUALITY DIFFERENCE COMPARED TO THE UE WITH THE HIGHER RANK ORDER [dB] |
|---|---|---|---|
| 1 | 8 | 33 | - |
| 2 | 63 | 32 | 1 |
| 3 | 20 | 29 | 3 |
| 4 | 98 | 29 | 0 |
| 5 | 224 | 27 | 2 |
| 6 | 120 | 5 | 22 |
| 7 | 38 | 4 | 1 |
| 8 | 192 | 2 | 2 |
| 9 | 154 | 0 | 2 |
| 10 | 56 | −2 | 2 |
| 11 | 189 | −3 | 1 |
| ... | ... | ... | ... |

TRANSMIT POWER CONTROL METHOD FOR REDUCING CELLULAR INTERFERENCE IN CELLULAR RADIO COMMUNICATION SYSTEM AND RADIO BASE STATION DEVICE FOR IMPLEMENTING THE SAME

CLAIM OF PRIORITY

The present application claims priority from Japanese patent application JP 2010-041280 filed on Feb. 26, 2010, and JP 2010-168808 filed on Jul. 28, 2010, the contents of which are hereby incorporated by reference into this application.

FIELD OF THE INVENTION

The present invention relates to radio communication systems and more particularly to a transmit power control method for a cellular radio communication system and a radio base station device for implementing the method.

BACKGROUND OF THE INVENTION

When a plurality of base stations, each covering an area of hundreds of meters or several kilometers with high transmit power (hereinafter called a macro-cell base station), are installed for a radio communication system, a mobile station can make radio communications in a wide area. However, since radio waves used for radio communications may be intercepted or may be attenuated by a building or the like, there may be places in which radio waves from a macro-cell base station weaken, for example, indoor places.

In some cases, a base station which uses low transmit power and covers a small area (hereinafter called a femto-cell base station) is installed in order to ensure stable communications even in a place where radio waves from a macro-cell base station weaken. When a femto-cell base station is installed, a mobile station can make communications even in a place where radio waves from the macro-cell base station weaken.

On the other hand, in a cellular radio communication system, since a plurality of cells share radio resources, a communication in a cell causes interference to a communication in another cell. For example, since a downlink communication in a cell from a base station to a mobile station results in interference to a downlink communication in an adjacent cell, the quality of signals received by a mobile station near a cell boundary may be deteriorated. Also, an uplink communication in a cell from a mobile station to a base station results in interference town uplink communication in an adjacent cell. Therefore, in order to ensure a satisfactory communication quality, the mobile station must increase the power for uplink transmission, resulting in an increase in power consumption by the mobile station. Unless the uplink transmit power is increased so as to compensate for the effect of interference to an uplink communication, the quality of uplink signals received by the base station is deteriorated.

In order to reduce the effect of such interference, JP-A-2009-253569 discloses a technique which reduces the interference between a macro-cell base station and a femto-cell base station. Also, JP-A-2007-243505 discloses a technique which reduces the interference to other cells even when a small radio base station device is relocated.

SUMMARY OF THE INVENTION

According to the technique proposed by JP-A-2007-243505, a base station device includes a part that measures propagation loss between the device and another base station' device, in which it controls its transmit power based on the measured propagation loss. However, propagation loss between the base station device and another is not always consistent with loss in downlink communications from the base station to a mobile station, which poses the problem that the effect of interference reduction may be limited depending on the surrounding environments of the base station and mobile station.

The present invention provides a method for controlling transmit power which reduces interference to other cells regardless of the surrounding environments of a base station and a mobile station, and a radio base station device which implements the method.

According to a first aspect of the invention, in order to solve at least one of the above problems, there is provided a radio base station device which collects, from a plurality of mobile stations, quality data indicating the communication quality measured by mobile stations, aggregates the collected quality data and changes the transmit power for transmissions from the radio base station device to the mobile stations depending on the aggregation result. The aggregation result is, for example, an average of quality data or quality distribution data. The radio base station device according to the first aspect compares the aggregation result with a criterion value and changes the transmit power depending on the result of comparison. The radio base station device according to the first aspect updates the criterion value based on quality distribution data in the aggregation result. Also the radio base station device according to the first aspect is within the cell (communication range) of another radio base station device.

According to a second aspect of the invention, in order to solve at least one of the above problems, there is provided a radio base station device which includes a part that sends a pilot signal and a part that controls transmit power, in which it holds a criterion value indicating a target channel quality value for mobile stations within a communication range of the base station, quality data is created based on reports from one or a plurality of mobile stations and stored, a first representative value indicating average channel quality for the mobile station or mobile stations is created from the stored quality data, the transmit power is changed depending on a result of comparison between the first representative value and the criterion value, a second representative value indicating distribution of low channel quality is created from the stored quality data, and the criterion value is updated depending on a result of comparison between the second, representative value for mobile station channel quality data and the criterion value. According to a third aspect of the invention, a communication system includes a plurality of base stations whose ranges of radio communications with mobile stations at least partially overlap each other, in which at least one base station collects, from a plurality of mobile stations, quality data indicating the communication quality measured by mobile stations, aggregates the collected quality data and changes the transmit power for transmissions from the base station to the mobile stations depending on the aggregation result.

According to a fourth aspect of the invention, there is provided a transmit power control method for a base station whose range of radio communications with mobile stations at least partially overlaps that of another base station, in which the base station collects, from a plurality of mobile stations, quality data indicating the communication quality measured by mobile stations, aggregates the collected quality data, and changes the transmit power for transmissions from the base station to the mobile stations depending on the aggregation result.

According to a fifth aspect of the invention, there is provided a transmit power control method in which a base station collects, from a plurality of mobile stations, quality data indicating the communication quality measured by the mobile stations, and decides transmit power for transmissions from the base station to the mobile stations, based on the relation among the collected quality data.

According to the invention, the transmit power control technique for a radio base station device in a radio communication system reduces interference between cells.

BRIEF DESCRIPTION OF THE DRAWINGS

FIG. 4 schematically shows a base station implementation which uses a CPU or DSP as a main component;

FIG. 5 shows an example of data which is given in a received power report;

FIG. 6 shows an example of reported power data stored at the step of reported power data storage;

FIG. 14 shows quality distribution data in the second embodiment.

DETAILED DESCRIPTION OF THE PREFERRED EMBODIMENTS

Next, a preferred embodiment of the present invention will be described referring to the accompanying drawings.

A pilot signal hereinafter refers to a signal with a fixed or semi-fixed pattern which is used as an amplitude or phase reference signal for demodulating a received signal or as a reference signal for estimating received power or propagation path information and is also called a reference signal. The pilot signal which is used as a reference signal for demodulation may be the same as or different from the pilot signal which is used as a reference signal for estimating received power or propagation path information. Also, a pilot signal may be shared by plural mobile stations in a cell or may be used by each mobile station individually.

In the example given below, a sequence or process flow may be described in a specific order. However, the order may be changed or different steps may be carried out concurrently except when the sequence is order-dependent, for example, the result of a given processing step is used at the next step.

The example given below assumes that the base station which is focused to explain the transmit power control method according to this embodiment is a femto-cell base station and a macro-cell base station is located adjacent to the femto-cell base station. However, the adjacent base station may also adopt the transmit power control method according to this embodiment. In the explanation below, when it is not necessary to distinguish between the femto-cell base station and adjacent macro-cell base station, they are simply referred to as base stations.

Figure 1:
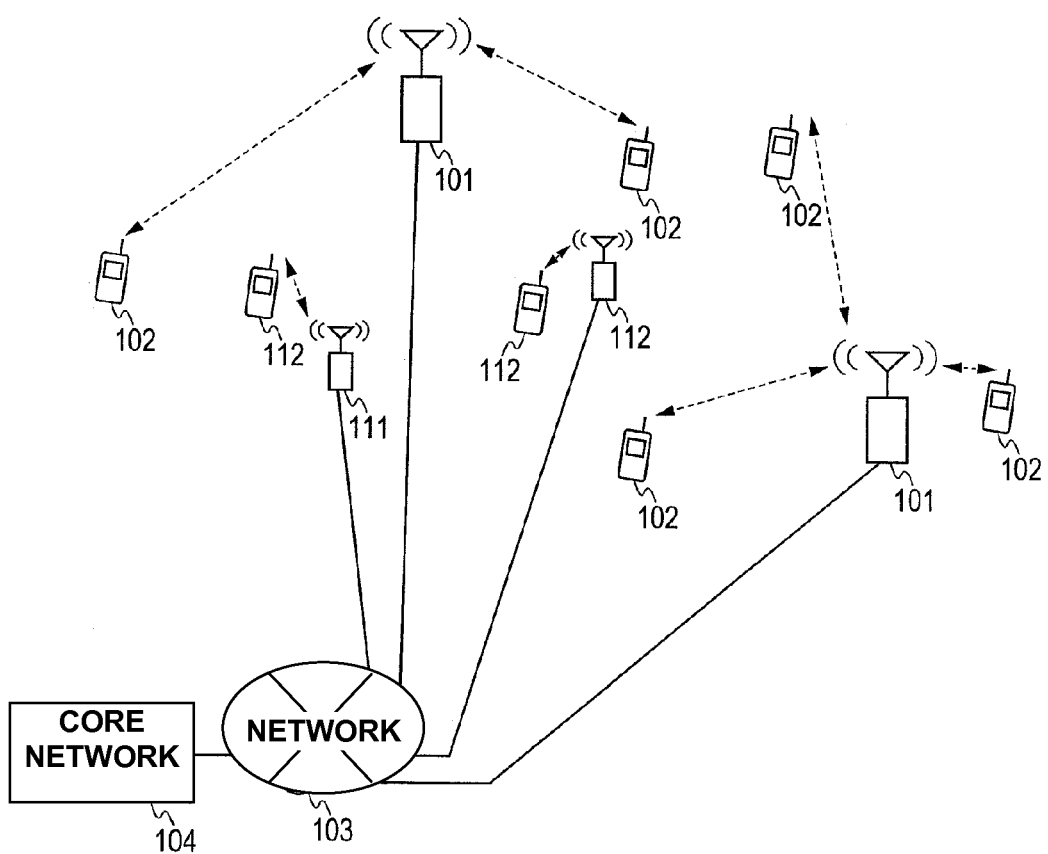
FIG. 1 shows an example of the configuration of a cellular radio communication system.

FIG. 1 shows an example of the configuration of a cellular radio communication system according to this embodiment. In this example, the cellular radio communication system includes a plurality of macro-cell base stations 101, a plurality of femto-cell base stations 111, a plurality of mobile stations 102 and 112, a network connected with a plurality of base stations, and a core network 104 connected with base stations through a network. In the explanation below, a signal or communication from a macro-cell base station 101 or femto-cell base station 111 to a mobile station 102 or 112 is referred to as a downlink signal or downlink communication. Conversely, a signal or communication from a mobile station 102 or 112 to a macro-cell base station 101 or femto-cell base station 111 is referred to as an uplink signal or uplink communication.

A macro-cell base station 101 is connected with the core network 104 through the network 103. The macro-cell base station 101 sends a downlink signal to a mobile station 102 and receives an uplink signal from a mobile station 102. Like the macro-cell base station 101, a femto-cell base station 111 is connected with the core network 104 through the network 103 and sends a downlink signal to a mobile station 112 and receives an uplink signal from a mobile station 112.

The network 103 connected with a macro-cell base station 101 and the network 103 connected with a femto-cell base station 111 may be the same network or different from each other or the macro-cell and femto-cell base stations may be connected with different networks through gateways. The core network 104 has a mobility control function and also serves as a gateway to another network.

Whether a mobile station 102 or 112 communicates with a macro-cell base station 101 or femto-cell base station 111 is determined depending on the channel quality of a downlink or uplink signal or propagation loss. As the mobile station moves and the propagation environment changes, handover may be carried out to change the base station to be communicated with through the core network 104. In the case of FIG. 1, the area in which a femto-cell base station 111 communicates with a mobile station is smaller than the area in which a macro-cell base station 101 communicates with a mobile station. The area covered by one base station may be included in the area covered by another base station or may partially overlap the area covered by another base station, whether they are macro-cell base stations or femto-cell base stations.

Figure 2:
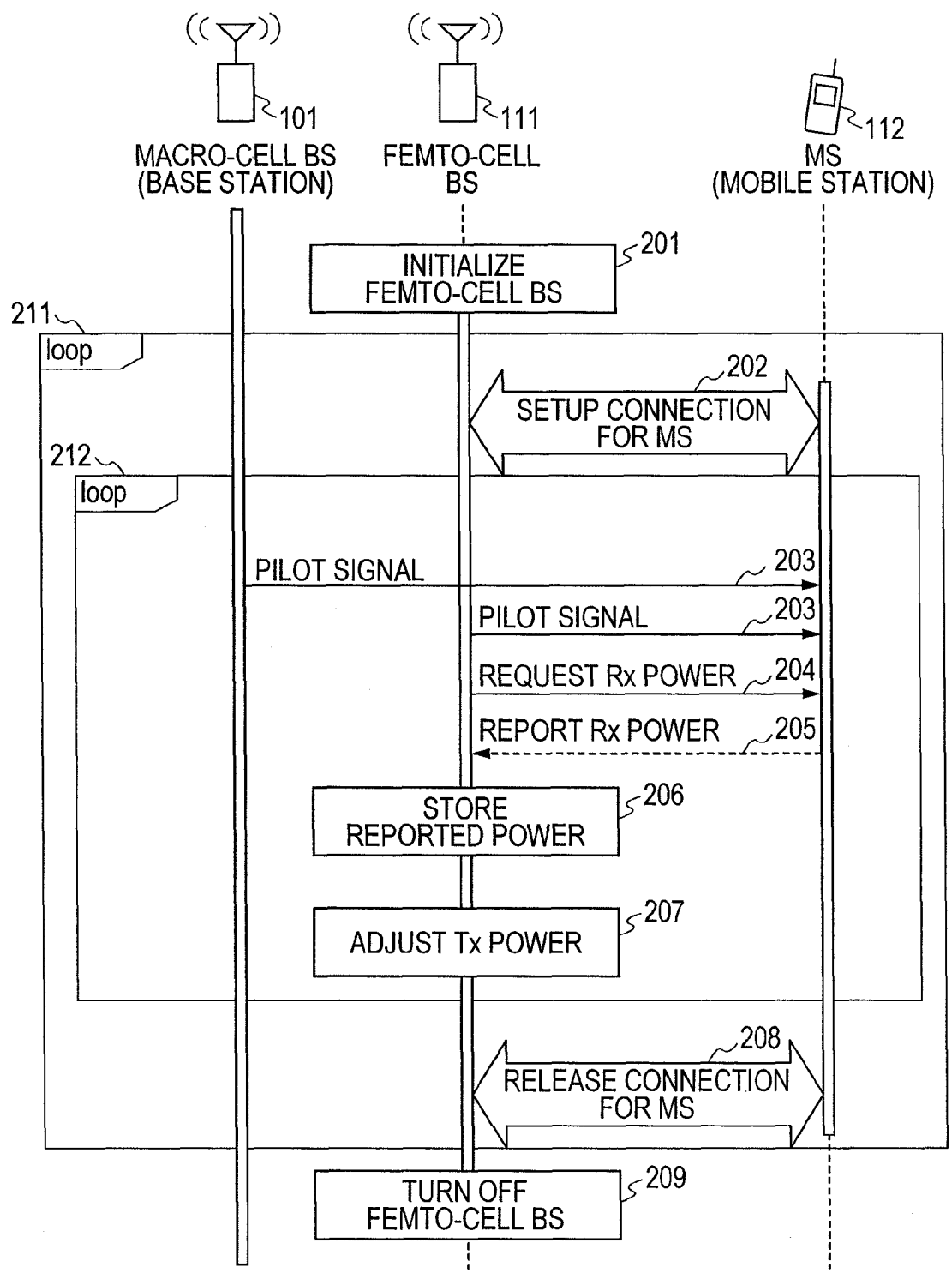
FIG. 2 shows an example of a transmit power control sequence.

FIG. 2 shows an example of a transmit power control sequence in this embodiment.

As the femto-cell base station 111 is started, for example, by turning on the power, it carries out the step of femto-cell base station initialization (201). The step of femto-cell base station initialization (201) is a process to set initial parameters required for operation of the base station, including determination of the level of power for transmission from the femto-cell base station 111. The femto-cell base station 111 repeats the sequence of steps in a loop 211 from the step of femto-cell base station initialization (201) to the step of turn off femto-cell base station (209). The step of turn off femto-cell base station (209) is a process to shut down the femto-cell base station 111, which is performed, for example, by turning off the power.

The step of mobile station connection (202) is carried out when the mobile station 112 moves into the cell of the femto-cell base station 111 from outside the cell or when the mobile station 112 is turned on. The step of mobile station connection (202) includes synchronization between the femto-cell base station 111 and mobile station 112, connection request from the mobile station 112 to the femto-cell base station 111, and permission from the femto-cell base station 111 to the mobile station 112 and may also include signaling between the femto-cell base station and the core network 104. The step of mobile station connection release (208) is carried out, for example, when the mobile station 112 moves out of the cell of the femto-cell base station 111 and this step may include signaling between the femto-cell base station 111 and core network 104.

In a loop 212, the macro-cell base station 101 and femto-cell base station 111 send pilot signals 203 and the mobile station 112 receives the pilot signals 203. The pilot signals can be sent from the macro-cell base station 101 and femto-cell base station 111 either continuously or intermittently. In addition, the macro-cell base station 101 and femto-cell base station 111 can send pilot signals 203 even outside the loop 212 and at any time. Also, the mobile station 112 can receive the pilot signal 203 from the femto-cell base station 111 and the pilot signal 203 from the macro-cell base station 101 at the same time or different times.

The pilot signals 203 which the mobile station 112 receives are not limited to a pilot signal from one femto-cell base station 111 and a pilot signal from one macro-cell base station 101. For example, the mobile station 112 may receive pilot signals 203 from two or more macro-cell base stations 101 or may not receive any pilot signal 203 from a macro-cell base station 101.

The femto-cell base station 111 sends a request 204 for received power data to the mobile station 112. The mobile station 112 sends a received power report 205 to the femto-cell base station 111 based on the intensity of the received pilot signal 203. The received power report 205 is a response to the request for received power data which includes the value of received power and the ID of the base station which has sent the signal received at that received power value. The received power value in the received power report 205 may be an instantaneous value of the received power of pilot signals, an average of received power of pilot signals in a given period, or a value obtained through several quantization stages. The received power report 205 which the mobile station 112 sends in response to one received power data request 204 may include received power data for pilot signals 203 from only one base station or include received power data for pilot signals 203 from plural base stations.

A received power report 205 is not only issued as a response to a received power data request 204, but also can be sent from the mobile station 112 at the discretion of the mobile station 112. Alternatively, the mobile station 112 can send a received power report 205 two or more times or periodically at regular time intervals in response to a single received power data request 204. Also, the frequency of issuance of a received power data request 204 from the femto-cell base station 111 to the mobile station 112 or the frequency of issuance of a received power report 205 from the mobile station 112 to the femto-cell base station 111 may be varied depending on whether the mobile station 112 is communicating or not, or the number of mobile stations 112 connected with the femto-cell base station 111. Other data communications also take place between the mobile station 112 and base station, though description of such communications is omitted here.

The received power value contained in the received power report 205 is stored in the femto-cell base station 111 at the step of reported power data storage (206). The stored data is used at the step of transmit power adjustment (207).

At the step of transmit power adjustment (207), the transmit power from the femto-cell base station 111 is adjusted based on the reported received power value from the mobile station 112 which has been stored at the step of reported power data storage (206). The step of transmit power adjustment (207) may be carried out each time the step of reported power data storage (206) is carried out or may be carried out every several times of the step of reported power data storage (206) or periodically at regular time intervals. Also, these adjustment frequency options may be combined.

The steps in the loop 211 from mobile station connection (202) to mobile station disconnection (208) are repeated each time the mobile station 112 is connected with the femto-cell base station 111. Although FIG. 2 shows the sequence for one mobile station 112, this sequence is performed for plural mobile stations 112 in the same way. Specifically, after the steps from mobile station connection (202) to mobile station disconnection (208) are carried out for one mobile station 112, the steps from mobile station connection (202) to mobile station disconnection (208) may be carried out for another mobile station 112. Or the steps from mobile station connection (202) to mobile station disconnection (208) may be carried out for plural mobile stations 112 simultaneously. This means that after the step of mobile station connection (202) for one mobile station 112 is carried out and before the step of mobile station disconnection (208) for that mobile station is carried out, the step of mobile station connection may be carried out for another mobile station 112. In this case, the steps included in the loop 212 from mobile station connection (202) to mobile station disconnection (208) are carried out for plural mobile stations 112 concurrently.

Figure 3:
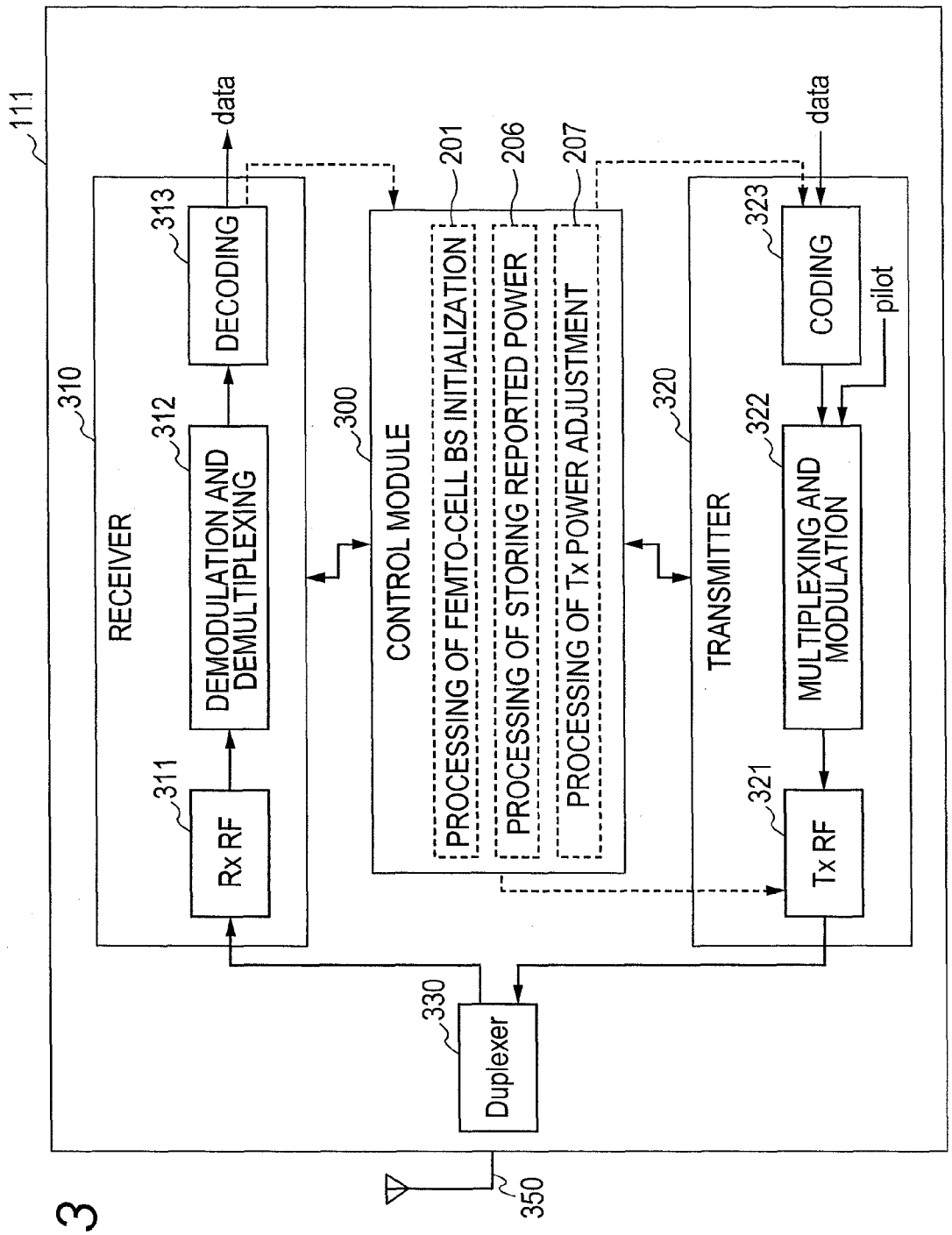
FIG. 3 shows an example of the configuration of a base station.

FIG. 3 shows an example of the configuration of a base station 111 in this embodiment.

A control module 300 controls all transmissions and receptions in the whole base station including a receiver module 310 and a transmitter module 320. The control module 300 creates a control signal which the base station should send and gives the control signal to a coding block 323 in the transmitter module 320. Also, the control module 300 determines the transmit power level for the base station and notifies a transmission RF part 321 in the transmitter module 320 of the transmit power level. The control signal which the base station should send is, for example, a signal to be sent from the base station to the mobile station at the step of mobile station connection (202) or a received power data request 204 or a signal to be broadcast within the cell of the base station to notify of a parameter such as the transmit power of the base station.

Furthermore, the control module 300 receives, from a decoding section 313 in the receiver module 310, a control signal which the base station has received. For example, the control signal which the base station has received is a signal or received power report 205 which is sent from the mobile station to the base station at the step of mobile station connection (202) or at the step of mobile station disconnection (208). Also, the control module 300 carries out the steps of femto-cell base station initialization (201), reported power data storage (206) and transmit power adjustment (207) and creates a transmit power value of which the transmission RF part 321 is notified.

The receiver module 310 enables the base station to receive a signal from a mobile station 112. The receiver module 310 includes a reception RF section 311, a demodulation/demultiplexing section 312, and a decoding section 313. The reception RF section 311 performs wave filtration, down-conversion, amplification, and analog-digital conversion on the signal given to the receiver module 310 by a duplexer 330 and creates a baseband receiver signal and gives the baseband receiver signal to the demodulation/demultiplexing section 312.

The demodulation/demultiplexing section 312 demodulates the received baseband receiver signal and divides it into signals for different channels and send them to the decoding section 313. Here, the demodulation process includes demodulation for PSK (Phase Shift Keying) or QAM (Quadrature Amplitude Modulation), synchronization, despreading for CDMA (Code Division Multiple Access), and the FFT (Fast Fourier Transform) process for OFDMA (Orthogonal Frequency Division Multiple Access).

The decoding section 313 decodes the demodulated signal for each channel and outputs it from the receiver module. Among the signals decoded in the decoding section 313, the control signal is sent to the control module 300. Here, the decoding process includes de-interleaving for returning the altered order of signals for transmission to the initial order, decoding of error correction codes such as turbo codes and convolutional codes, and check by error detection codes such as CRC (Cyclic Redundancy Check). Depending on the result of CRC, a HARQ (Hybrid Automatic Repeat reQuest) process which requests retransmission may be performed.

The transmitter module 320 is responsible for transmission of signals from the base station. The transmitter module 320 includes a transmission RF part 321, multiplexing/modulation section 322, and a coding block 323.

The coding block 323 encodes the transmission data which the transmitter module 320 has received and the control signal received from the control module 300 on a channel-by-channel basis and gives the result of encoding to the multiplexing/modulation section 322. Here, the encoding process includes addition of error detection codes such as CRC, encoding using error correction codes such as turbo codes and convolutional codes, and interleaving as a process to alter the order of signals.

The multiplexing/modulation section 322 multiplexes and modulates the signal and pilot signal which it has received from the coding block 323 to create a baseband transmitter signal and sends it to the transmission RF part 321. Here the modulation process includes symbol modulation such as PSK and QAM, spreading for CDMA, IFFT (Inverse Fast Fourier Transform) processing for OFDMA, and addition of CP (Cyclic Prefix). When the multiplexing/modulation section 322 creates a baseband transmitter signal, it adjusts the amplitude of the signal created by modulation depending on the transmit power difference between channels.

The transmission RF part 321 performs digital-analog conversion, wave filtration, up-conversion, and amplification on the received baseband transmitter signal and sends the resulting signal to the duplexer 330 as an output from the transmitter module 320. At this time, the transmission RF part 321 adjusts the gain (amplification factor) depending on the transmit power level of which it has been notified by the control module 300.

The duplexer 330 sends a signal received from the radio zone through an antenna 350 to the receiver module 310 and transmits an output signal from the transmitter module 320 through the antenna to the radio zone.

Although FIG. 3 shows different signal processing blocks, in an actual system these blocks need not be independent from each other; instead a general-purpose processing module may be used to perform the different functions of the blocks.

For example, FIG. 4 shows the configuration of a base station device which uses a DSP or CPU as a main component. The base station shown in FIG. 4 includes a CPU/DSP module 401, memory 402, a logic circuit module 403, an interface 404, and an RF module 405 which are connected through a bus 406. The abovementioned signal processing arithmetic operations and signal processing control operations are performed in accordance with a program for operations including the steps of 201, 206, 207, and 209 in the sequence shown in FIG. 2. The memory module 402 holds transmission signals and received signals under processing or before or after processing, tables used for signal processing, and data such as stored reported power data and quality distribution data which will be described later. The logic circuit module 403 performs the abovementioned signal processing arithmetic operations and signal processing control operations in the same way as the CPU/DSP 401.

The interface module 404 deals with input and output of control signals, unprocessed transmission signals, and processed received signals. The RF module 405 converts a transmission signal into a signal in the radio frequency band and transmits it through the antenna and converts a signal received through the antenna into a signal in the baseband. The signal processing arithmetic operations and signal processing control operations in the various processing blocks including the steps of transmit power adjustment, transmit power change decision, and parameter change decision which will be described later are performed using either the program for the CPU/DSP module 401 or the arithmetic circuit in the logic circuit module 403, or both and if necessary, the memory module 402.

The system shown in FIG. 4 is the simplest form of implementation in which one module unit is provided for each module type. However, the system may include plural CPU/DSP module units or plural buses 406. It may include plural CPU/DSP module 401 units or plural buses 406. If it includes plural buses 406, all buses need not be connected with all modules. For example, one bus may be connected with all modules and another bus may be connected only with the memory module 402 and logic circuit module 403.

If the CPU/DSP module 401 can perform signal processing arithmetic operations and signal processing control operations for all processing blocks, the logic circuit module 403 is omissible. Conversely, if the logic circuit module 403 can perform signal processing arithmetic operations and signal processing control operations for all processing blocks, the CPU/DSP module 401 is omissible.

The base station as shown in FIGS. 3 and 4 may be, for example, a femto-cell base station 111 as shown in FIG. 1.

FIG. 5 shows an example of information which is given in a received power report in this embodiment. In this example, the information in the report includes mobile station ID 1010, time stamp 1020, base station ID 1030, and reported received power value 1040. The mobile station ID 1010 is the ID of the mobile station which has sent the information and need not always be included in the report information. The time stamp 1020 is time data for the information and is added when the mobile station is sending the report. In the example shown in FIG. 5, a time stamp 1020 is given for each base station ID 1030 and each reported received power value 1040. However, only one time stamp may be given for a whole report. The base station ID 1030 indicates that the reported received power value has been calculated by measuring a pilot signal sent from the base station identified by that base station ID. The reported received power value 1040 is the value of the received power which is reported by a mobile station and may be either the result of measurement made by the mobile station or an index obtained through several quantization stages. In other words, the base station ID allows a femto-cell base station 111 to get not only the received power value which a mobile station has calculated by measuring a pilot signal sent from the femto-cell base station itself, but also the received power value which the mobile station has calculated by measuring a pilot signal sent from the macro-cell base station 101 or another femto-cell base station 111.

While four received power values are reported at a time in the example shown in FIG. 5, the number of received power values which can be reported at a time is not limited. For example, a single received power value may be reported in a single report.

FIG. 6 shows an example of reported power data stored at the step of reported power data storage in this embodiment. In this example, the stored data is a data string consisting of mobile station ID 1110, time stamp 1120, and signal-to-interference power ratio 1130.

The mobile station ID 1110 is the ID of a mobile station which has sent the data. The time stamp 1120 is time data for the information and may be time data which the mobile station attaches in sending the report, or time data which shows the time when the base station received the report from the mobile station.

The signal-to-interference power ratio 1130 is a value indicating the channel quality in the mobile station as calculated from a single or plural reported power values which satisfy a given requirement. The requirement here may be that the reported received power value or values should be sent at a time from a mobile station or mobile stations or that the reported received power value or values should be sent within a given time range from a mobile station or mobile stations. For example, the signal-to-interference power ratio can be calculated by dividing a representative signal power value by a representative interference power value.

Among the reported received power values which satisfy the above requirement, the representative signal power value is the average or largest value of the power values, which are calculated by measuring pilot signals sent from the base station itself. Among the reported received power values which satisfy the above requirement, the representative interference power value is the average or largest value of the power values, which are calculated by measuring pilot signals sent from another base station or the largest value of the average power values of the power values, which are calculated by measuring pilot signals sent from other base stations and averaging the measurement results for each base station. If there is no power value calculated by measuring a pilot signal sent from another base station, among the reported received power values which satisfy the above requirement, and thus a representative interference power value cannot be obtained, then it is assumed that the signal-to-interference power ratio is the maximum here.

While the data stored at the step of reported power data storage is a data string in the example shown in FIG. 6, instead plural data strings may be stored for each mobile station ID. The signal-to-interference power ratio calculated as described above may be stored as it is or the averaged signal-to-interference power ratio may be stored.

Figure 7:
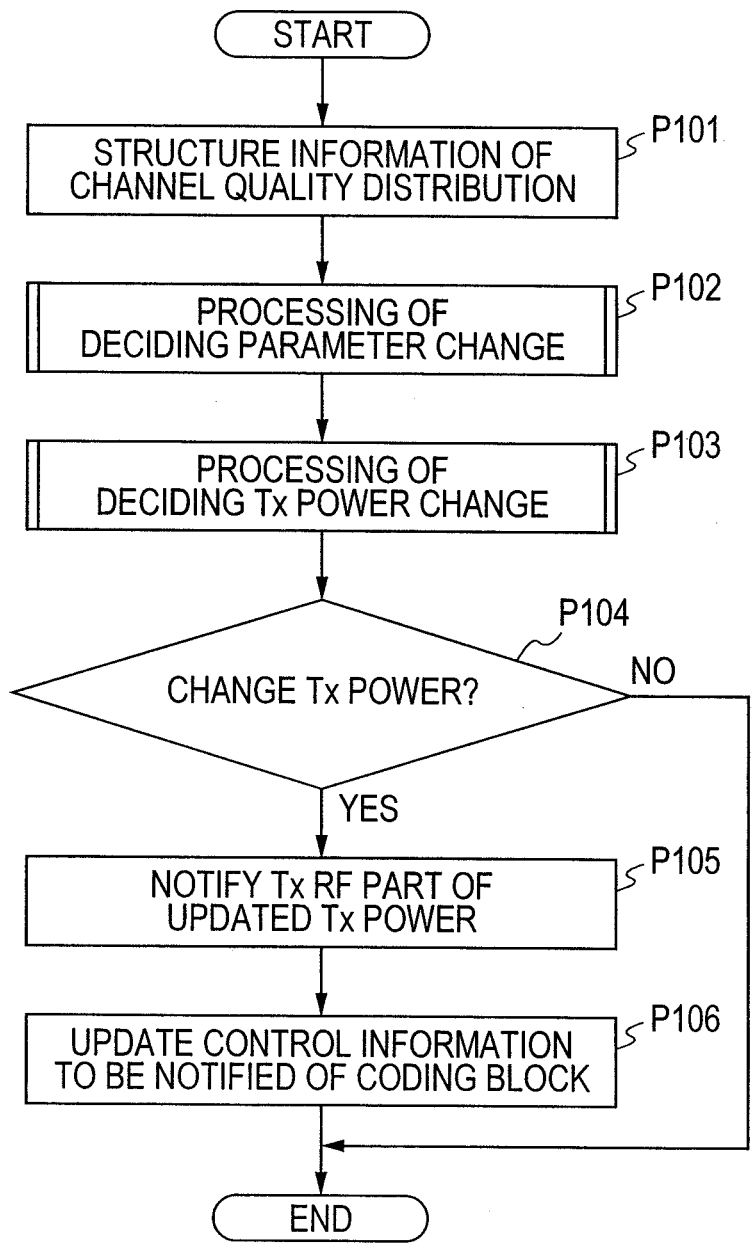
FIG. 7 shows a transmit power adjustment sequence.

FIG. 7 shows a transmit power adjustment sequence in this embodiment.

After the transmit power adjustment sequence is started, the control module 300 first structures information of channel quality distribution modified for easy handling at later steps, from the information stored at the step of reported power data storage (P101).

Figure 8:
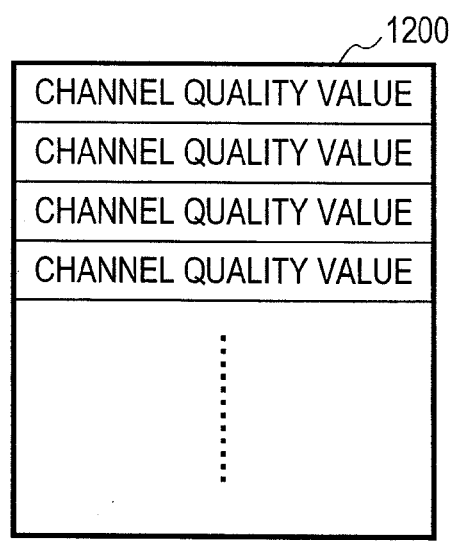
FIG. 8 shows an example of quality distribution data.

FIG. 8 shows an example of quality distribution data created at step P101. The quality distribution data shown in FIG. 8 is quality data extracted from the stored reported power data. For example, data belonging to a given time range is extracted from the data stored at the step of reported power data storage and the corresponding signal-to-interference power ratio 1130 is used as a channel quality value 1200.

Figure 9:
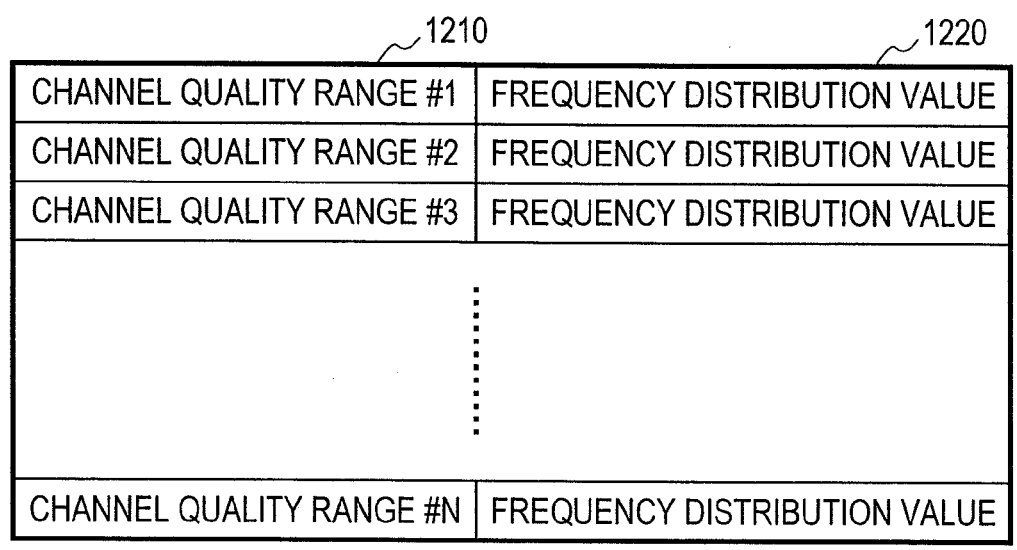
FIG. 9 shows another example of quality distribution data.

FIG. 9 shows another example of quality distribution data created at the step P101. The quality distribution data shown in FIG. 9 concerns the quality frequency distribution obtained from the data stored at the step of reported power data storage. For example, data belonging to a given time range is extracted from the data stored at the step of reported power data storage and the number of signal-to-interference power ratios 1130 corresponding to each channel quality range between channel quality range #1 and channel quality range #N is used as a frequency distribution value 1220. In other words, each signal-to-interference power ratio 1130 is assigned to a channel quality range according to the value of the ratio and the frequency distribution value 1220 is the number of signal-to-interference power ratios assigned to each channel quality range.

In the transmit power adjustment sequence, the next step is the step of parameter change decision P102 to decide whether or not to change the criterion value to be used at the step of transmit power change decision P103. If it is decided to be changed, the control module 300 updates the criterion value held therein. Then, the control module 300 carries out the step of transmit power change decision P103 to decide, from the criterion value indicating the target channel quality for the mobile stations in the cell and the quality distribution data, whether or not to change the transmit power. If it is decided at the step of transmit power change decision P103 that the transmit power should be changed, steps P104 and P105 are carried out through step P104 as a bifurcation point. At step P105, the control module 300 notifies the transmission RF part 321 of the updated transmit power value and the transmission RF part 321 adjusts the amplifier gain depending on the transmit power value of which it has been notified. At step P106, among the control signals sent from the control module 300 to the coding block 323, a transmit power value as a parameter for the base station which should be broadcast within the cell is updated. If it is not decided at the step of transmit power change decision P103 that the transmit power should be changed, the transmit power adjustment sequence is ended through the bifurcation point P104.

Figure 10:
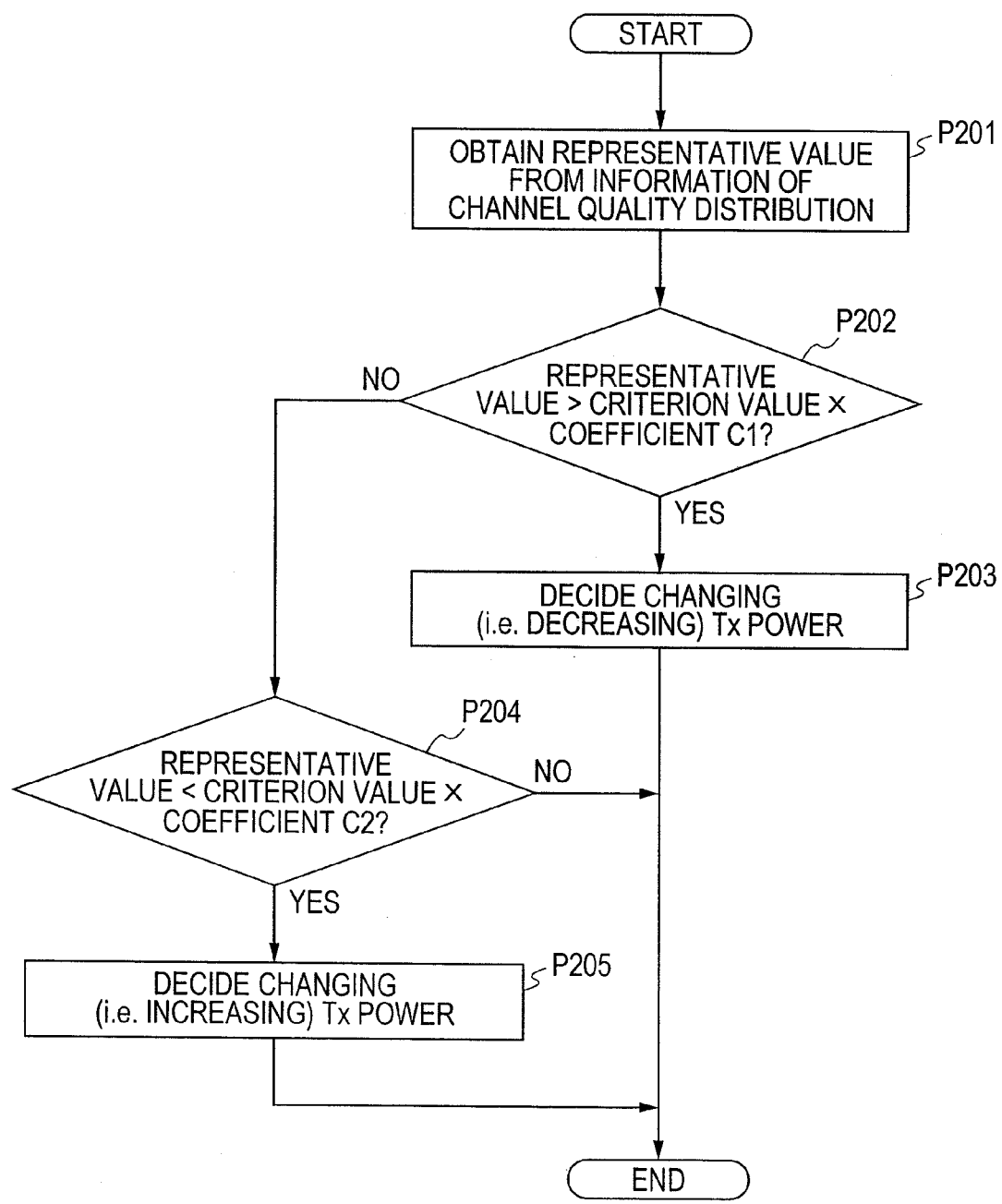
FIG. 10 shows an example of the process of deciding whether to change the transmit power.

FIG. 10 is a flowchart of the process to decide whether or not to change the transmit power based on the criterion value indicating the target channel quality for mobile stations in the cell and the quality distribution data, as an example of the step of transmit power change decision P103 shown in FIG. 7. After the process as the step of transmit power change decision is started, the control module 300 obtains a representative value from the information of channel quality distribution held in the base station (P201). The representative value here is, for example, the average of quality distribution data or the median (0.5 quantile) of quality distribution data.

The control module 300 compares the representative value obtained at step P201 with the criterion value multiplied by coefficient C1 (P202). If the representative value is found by comparison at step P202 to be larger, the control module 300 proceeds to step P203 and if not, the control module 300 goes to the bifurcation point P 204. The coefficient C1 here may be 1 or a number larger than 1, for example, 1.1.

The control module 300 decides to decrease the transmit power (P203) and ends the step of transmit power change decision. The transmit power value decreased at step P203 may be a fixed value or a value proportional to the representative value minus the criterion value. As shown in FIG. 7, the control module 300 notifies the transmission RF part of the transmit power value updated according to the decision.

On the other hand, if the representative value is not larger than the criterion value multiplied by coefficient C1, the control module 300 compares the representative value with the criterion value multiplied by coefficient C2 (P204). If the representative value is found by comparison to be smaller, the control module 300 proceeds to step P205 and if not, the control module 300 ends the step of transmit power change decision. The coefficient C2 here may be 1 or a number smaller than 1, for example, 0.9.

At the step P205, the control module 300 decides to increase the transmit power, ends the step of transmit power change decision, and notifies the transmission RF part of the transmit power value updated according to the decision. Here, the updated transmit power value may be a fixed value or a value proportional to the criterion value minus the representative value.

Figure 11:
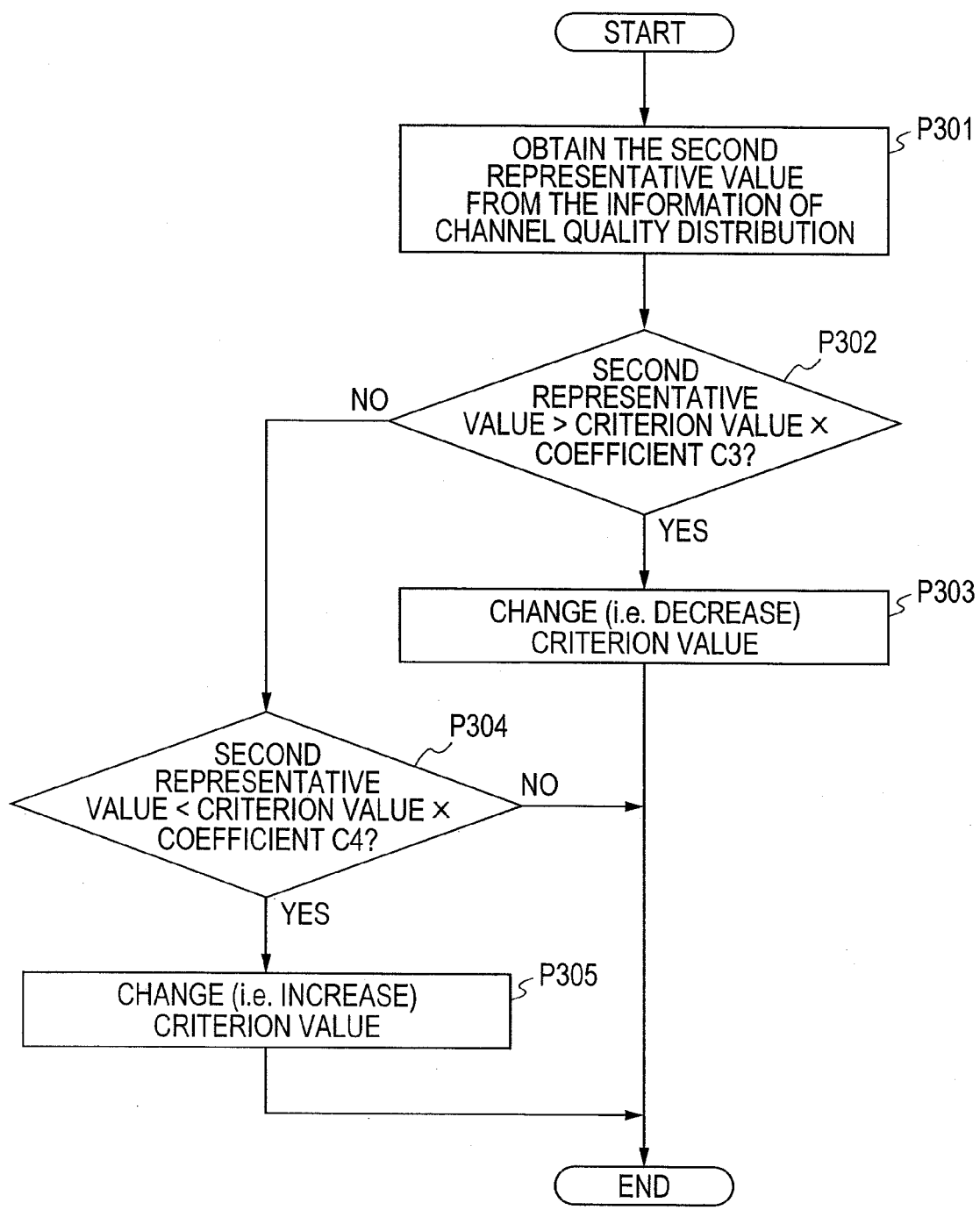
FIG. 11 shows an example of the process of deciding whether to change a parameter.

FIG. 11 is a flowchart showing details of the step of parameter change decision P102 shown in FIG. 7. An example of the process to decide whether or not to change the criterion value which the control module 300 uses at the step of transmit power change decision P103 is explained below referring to FIG. 11. After the process as the step of parameter change decision is started, the control module 300 obtains a second representative value from the information of channel quality distribution (P301). The second representative value here is, for example, the average quality distribution data multiplied by a coefficient (for example, 0.5) or a quantile value lower than the median of quality distribution data (for example, 0.2 quantile). For example, the second representative value is smaller than the first representative value shown in FIG. 10.

The control module 300 compares the second representative value with the criterion value multiplied by coefficient C3 (P302). If the second representative value is found by comparison at step P302 to be larger, the control module 300 proceeds to step P303 and if not, the control module 300 goes to step P304 (bifurcation point). The coefficient C3 here should be a number smaller than 1, for example, 0.3.

The control module 300 decides to decrease the criterion value (P303) and ends the step of parameter change decision. When the control module 300 decides to decrease the criterion value at the step P303, it updates the criterion value held therein. The criterion value decreased at the step P303 may be a fixed value or a value proportional to the second representative value minus the criterion value multiplied by coefficient C3.

On the other hand, if the second representative value is not larger than the criterion value multiplied by coefficient C3, the control module 300 compares the second representative value with the criterion value multiplied by coefficient C4 (P304). If the representative value is found by comparison to be smaller, the control module 300 proceeds to step P305 and if not, the control module 300 ends the step of parameter change decision. The coefficient C4 here maybe the same value as the coefficient C3 or smaller than the coefficient C3. At the step P305, the control module 300 decides to increase the criterion value and ends the step of parameter change decision. Here, the criterion value increased at the step P305 may be a fixed value or a value proportional to the criterion value multiplied by coefficient C4 minus the second representative value. Furthermore, the control module 300, which has decided to increase the criterion value, holds the increased criterion value.

Figure 12:
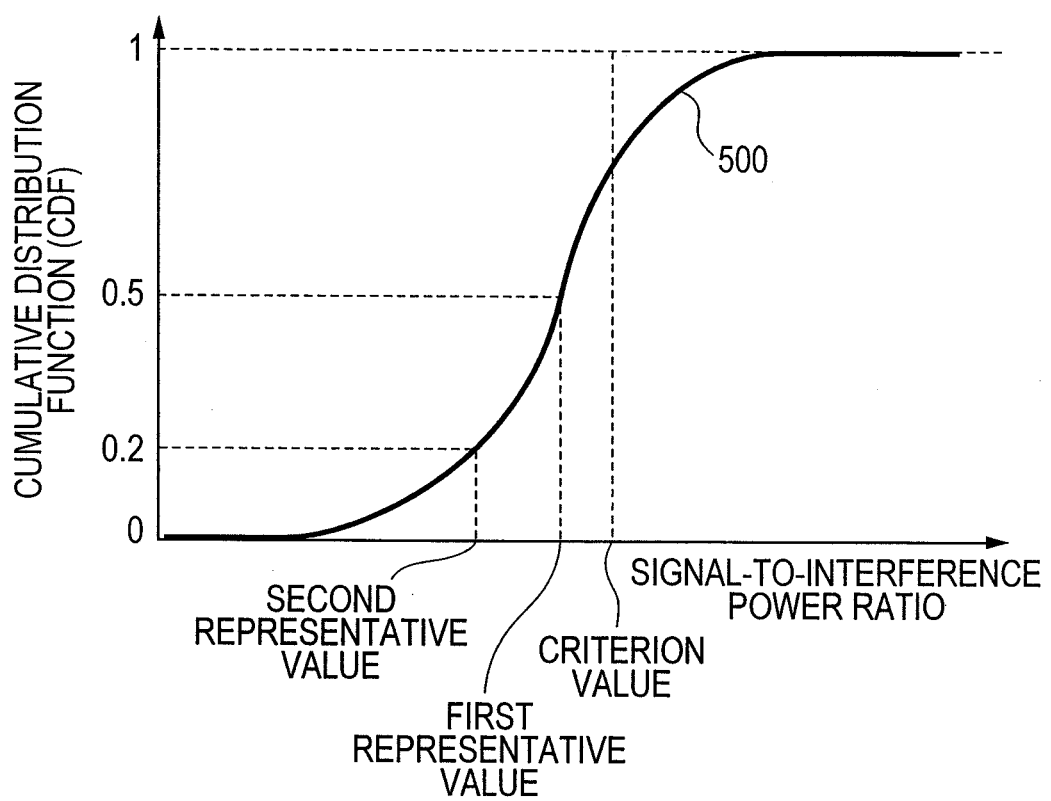
FIG. 12 is a graph showing an example of representative values for quality distribution data as used at the step of transmit power change decision and the step of parameter change decision.

FIG. 12 is a graph showing an example of a representative value for quality distribution data as used at the step of transmit power change decision and the step of parameter change decision. In FIG. 2, signal-to-interference power ratios are used as quality data and curve 500 shows cumulative distribution function distribution.

In the example shown in FIG. 12, the 0.5 quantile value is used as the first representative value for the step of transmit power change decision and the 0.2 quantile value is used as the second representative value for the step of parameter change decision. As quality distribution data changes as a result of the step of transmit power change decision as shown in FIG. 10, the first representative value is controlled to become close to the criterion value. Thus, since the average quality data or 0.5 quantile value is selected for the first representative value, the average quality data is controlled to become close to the criterion value.

On the other hand, at the step of parameter change decision shown in FIG. 11, when the difference between the second representative value and criterion value is larger, the criterion value is controlled to decrease. For example, since the 0.2 quantile value is selected for the second representative value, when the quality distribution is wider, the criterion value is controlled to decrease, and when the quality distribution is smaller, the criterion value is controlled to increase.

The form of data at each processing step as described so far is just an example. In other words, the form of data at each processing step may be varied. For example, in the above explanation, the content of a received power report which is sent from a mobile station to a base station is received power data and the data is converted into a signal-to-interference power ratio at the step of reported power data storage. However, it is acceptable that when a received power report is sent from the mobile station to the base station, the data in the report may be already signal-to-interference power ratio data.

As a variation of the sequence shown in FIG. 2, a femto-cell base station 111 may once increase the transmit power of a radio signal to be sent from the femto-cell base station 111. When the transmit power of a radio signal from the femto-cell base station is increased, the mobile station 112 recognizes that the received power of a pilot signal from the femto-cell base station has increased and it is connected with the femto-cell base station 111 at the step of mobile station connection (202, setup connection for MS) by handover, etc. Specifically, when the mobile station 112 is located in the vicinity of the femto-cell base station and connected with the macro-cell base station 101, it is connected with the femto-cell base station by handover, etc. carried out by the macro-cell base station 101. Consequently, the femto-cell base station 111 collects a received power report concerning signals sent by the femto-cell base station, from the mobile station 112 connected with the macro-cell base station 101. In other words, the femto-cell base station 111 can collect received power reports concerning signals sent by the femto-cell base station, from mobile stations 112 including the mobile station located in the vicinity of the femto-cell base station and not connected with the femto-cell base station, so that it can know received power distribution of the mobile stations 112 and determine the transmit power based on the received power distribution of the mobile stations 112.

If a femto-cell base station is installed in a building and a macro-cell base station is installed outside the building, it is known that a signal passing through the outer wall of the building attenuates considerably (penetration loss). Therefore, interference to a mobile station connected with the macro-cell base station is expected to decrease due to penetration loss. This means that interference to the mobile station connected with the macro-cell base station can be reduced by adjusting the transmit power of the femto-cell base station depending on whether or not the femto-cell base station is installed in the building. This concludes the description of the first embodiment.

Next, a second embodiment of the invention will be described. Since the configuration and processes of the second embodiment are basically the same as those of the first embodiment, their description is omitted here.

According to the second embodiment, in the loop 211, the femto-cell base station 111 (FIG. 2) sends a signal at a transmit power level higher than the default transmit power set at the step of femto-cell base station initialization (201).

When the transmit power of a radio signal from the femto-cell base station is increased, the mobile station 112 recognizes that the received power of a pilot signal from the femto-cell base station has increased and it is connected with the femto-cell base station 111 at the step of mobile station connection (202, setup connection for MS) by handover, etc. Specifically, when the mobile station 112 is located in the vicinity of the femto-cell base station and connected with the macro-cell base station 101, it is connected with the femto-cell base station by handover, etc. carried out by the macro-cell base station 101.

Consequently, the femto-cell base station 111 can request a received power report to the mobile station connected with it by handover, etc. (204). The femto-cell base station 111 collects a received power report concerning signals sent by the femto-cell base station, from the mobile station 112 connected with the macro-cell base station 101 (205). In other words, the femto-cell base station 111 can collect received power reports concerning signals sent by the femto-cell base station, from mobile stations 112 including the mobile station located in the vicinity of the femto-cell base station and not connected with the femto-cell base station, so that it can know received power distribution of the mobile stations 112 and determine the transmit power based on the received power distribution of the plural mobile stations 112 at the step of transmit power adjustment (207).

Figure 13:
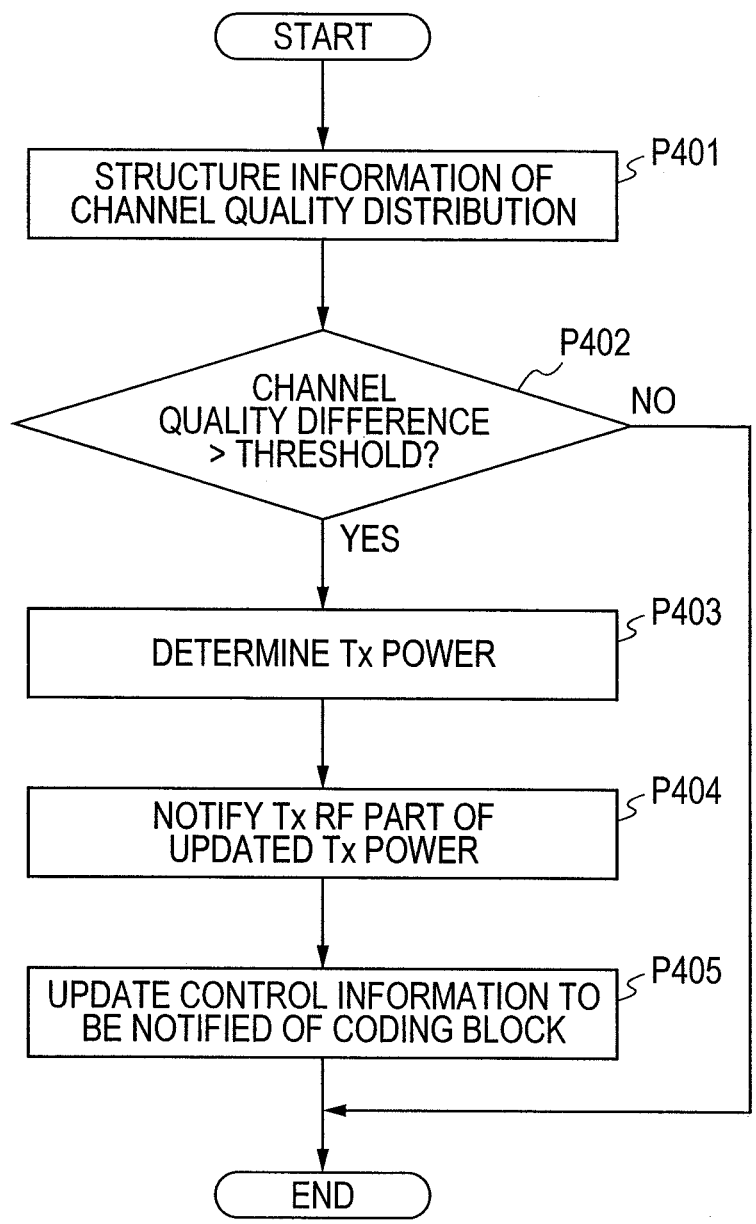
FIG. 13 shows a transmit power adjustment sequence according to a second embodiment of the invention.

Next, the transmit power adjustment sequence 207 in the second embodiment will be detailed referring to FIG. 13.

The control module 300 first structures information of channel quality distribution based on the channel quality on the femto-cell base station reported by the mobile stations at the step 205 in FIG. 2 (P401).

FIG. 14 shows an example of information of channel quality distribution structured by the control module 300 at step P401. In FIG. 14, reported channel quality values 1320 acquired by the femto-cell base station are listed in descending order (rank order 1300) in a tabular form. MS ID 1310 represents the ID which identifies the mobile station which has reported a channel quality value.

Referring back to FIG. 13, the control module 300 calculates channel quality difference 1330 compared to the UE with the higher rank order or one-rank higher quality.

Then, the control module 300 decides whether or not there is any channel quality difference 1330 in excess of a predetermined threshold in the table of FIG. 14 (P402). If the channel quality difference 1330 exceeds the threshold (Yes at step P402), the control module 300 proceeds to the step of transmit power determination P403 in order to change the transmit power.

If the channel quality difference 1330 does not exceed the threshold (No at the step P402), the control module 300 decides not to change the transmit power and ends the sequence. When the transmit power is not changed, the femto-cell base station is returned to the default transmit power after the transmit power adjustment sequence is ended.

At the step of transmit power determination (P403), the control module 300 assumes that a mobile station with channel quality difference 1330 in excess of the threshold is located on the other side of the outer wall of the building and determines the transmit power so that the communication quality of this mobile station is below the minimum channel quality level for communications. A mobile station having channel quality below the minimum level as a result of transmit power change is connected with another base station such as the macro-cell base station 101 by handover or reconnection.

Let's say that the channel quality difference 1330 for MS ID 120 in the table of FIG. 14 exceeds the threshold. The channel quality difference for MS ID 120 is 5 dB. If the minimum channel quality is −10 dB, when the femto-cell base station decreases its transmit power by 15 dB (=5 dB−(−10 dB)), the channel quality of MS ID 120 will be −10 dB, or not higher than the minimum channel quality. For a mobile station connected with the macro-cell base station 101, the channel quality for a signal from the femto-cell base station 111 indicates the intensity of interference power. For this reason, the control module 300 determines the transmit power of the femto-cell base station for each mobile station like MS ID 120 so that interference power to the mobile station is not higher than a predetermined level.

The subsequent steps P404 and P405 are the same as the steps P105 and P106 in FIG. 7.

If the channel quality difference 1330 for plural mobile stations is found at the step P402 to exceed the threshold, the control module 300 may select the mobile station with the highest rank order 1300 among them at the step P403. Alternatively the control module 300 may select the mobile station with the largest channel quality difference 1330 at the step P403.

As explained above, in the second embodiment, the femto-cell base station collects received power data on signals sent by the base station from mobile stations which have received these signals and determines the transmit power for each mobile station based on the result of comparison of received power values among the mobile stations.

At the step P401, the received power of a pilot signal from the femto-cell base station refers to channel quality in the above example, a combination of such power and the received power of a pilot signal from the macro-cell base station may be used to indicate channel quality. For example, "received power of a femto-cell pilot signal" divided by "received power of a macro-cell pilot signal" or the ratio between "received power of a femto-cell pilot signal" and "received power of a macro-cell pilot signal" may be used to indicate channel quality. In this case, each mobile station gives, in its received power report 205 to the femto-cell base station, data on received power of pilot signals not only from the femto-cell base station but also from a nearby base station such as the macro-cell base station 101 while the femto-cell base station extracts "received power of a femto-cell pilot signal" and "received power of a macro-cell pilot signal" from the report 205 and calculates channel quality.

In the above embodiment, as for signals transmitted from a femto-cell base station in a radio space, interference to a mobile station connected with another base station is reduced.

What is claimed is:

1. A base station device for making radio communications with one or a plurality of mobile stations, comprising:
   a pilot signal transmitter module for transmitting a pilot signal;
   a receiver module for receiving a response to the pilot signal from a mobile station;

a transmit power determination module for comparing received pilot signal quality data included in the responses from mobile stations and determining transmit power for transmission to each mobile station depending on a result of the comparison; and a mobile station signal transmitter module for transmitting a signal to the mobile station or mobile stations at the determined transmit power;

wherein the transmit power determination module:

holds first criterion value indicating minimum channel quality for mobile stations within a communication range of the base station;

creates quality data based on reports from one or a plurality of mobile stations and stores the quality data;

creates a first index indicating channel quality difference between mobile stations from the stored quality data; and determines transmit power depending on a result of comparison between the first index and the first criterion value;

wherein the transmit power determination module changes transmit power when the first index is larger than the first criterion value;

wherein the transmit power determination module holds a second criterion value indicating channel quality difference allowed between mobile stations within a communication range of the base station, selects a mobile station having the first index larger than the first criterion value and determines transmit power so as to make a channel quality value of the mobile station not larger than the second criterion value.

2. A base station device for making radio communications with one or a plurality of mobile stations, comprising:

a transmitter module for sending a pilot signal;

a holding module for holding a criterion value indicating a target channel quality value for mobile stations within a communication range of the base station;

a storage for creating quality data based on received power reports of the pilot signals received by the mobile station or mobile stations and storing the quality data;

a transmit power determination module for creating a first representative value indicating average channel quality for the mobile station or mobile stations from the stored quality data and determining transmit power for transmission to the mobile station or stations depending on a result of comparison between the first representative value and the criterion value; and a criterion value updating module for creating a second representative value indicating distribution of low channel quality and updating the criterion value depending on a result of comparison between the second representative value for mobile station quality data and the criterion value.

3. The base station device according to claim 2, wherein if the first representative value is smaller than the criterion value, the transmit power is increased.

4. The base station device according to claim 2, wherein if the first representative value is larger than the criterion value, the transmit power is decreased.

5. The base station device according to claim 2, wherein if the second representative value is smaller than a product of the criterion value and a coefficient, the criterion value is increased.

6. The base station device according to claim 2, wherein if the second representative value is larger than a product of the criterion value and a coefficient, the criterion value is decreased.

7. The base station device according to claim 2, wherein the quality data is a ratio between a value of received power of a pilot signal sent from the base station and a value of received power of a pilot signal sent from another base station.

8. The base station device according to claim 2, wherein the quality data is a value of received power of a pilot signal sent from the base station.

9. The base station device according to claim 2, wherein the first representative value is an average of quality data.

10. The base station device according to claim 2, wherein the first representative value is a quantile value of quality data.

11. The base station device according to claim 2, wherein the second representative value is a product of an average of quality data and a coefficient.

12. The base station device according to claim 2, wherein the second representative value is a quantile value of quality data.

13. The base station device according to claim 2, wherein the communication range is included in a communication range of another base station.

\* \* \* \* \*